(12) United States Patent
Yamazaki

(10) Patent No.: US 6,807,294 B2
(45) Date of Patent: Oct. 19, 2004

(54) IMAGE CAPTURING DEVICE

(75) Inventor: Yoshiro Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 700 days.

(21) Appl. No.: 09/855,712

(22) Filed: May 16, 2001

(65) Prior Publication Data

US 2002/0003896 A1 Jan. 10, 2002

(30) Foreign Application Priority Data

May 16, 2000 (JP) ........................................ 2000-143320

(51) Int. Cl.[7] .............................................. G06K 9/00
(52) U.S. Cl. ....................................................... 382/135
(58) Field of Search ................................ 382/112, 135, 382/137, 181; 396/14, 297; 355/18, 26, 401

(56) References Cited

U.S. PATENT DOCUMENTS

| | | | | |
|---|---|---|---|---|
| 5,390,003 A | * | 2/1995 | Yamaguchi et al. | ........ 399/366 |
| 5,430,276 A | * | 7/1995 | Ohtani et al. | ................ 235/375 |
| 6,040,856 A | * | 3/2000 | Sakaegi | .................... 348/231.6 |
| 6,658,135 B1 | * | 12/2003 | Morito et al. | ................ 382/100 |

* cited by examiner

Primary Examiner—Andrew W. Johns
Assistant Examiner—Shervin Nakhjavan
(74) Attorney, Agent, or Firm—Birch, Stewart, Kolasch & Birch, LLP

(57) ABSTRACT

In a digital still camera, it is determined whether a current photographing is performed in a document copy mode provided for precisely photographing a document or bar code, and if not, another determination is made as to whether the current photographing is performed under a particular image capturing condition including a resolution and a photographing distance. Further, if a determination that a paper money or security is photographed is affirmative, a predetermined image is overwritten on an image obtained by the photographing.

17 Claims, 6 Drawing Sheets

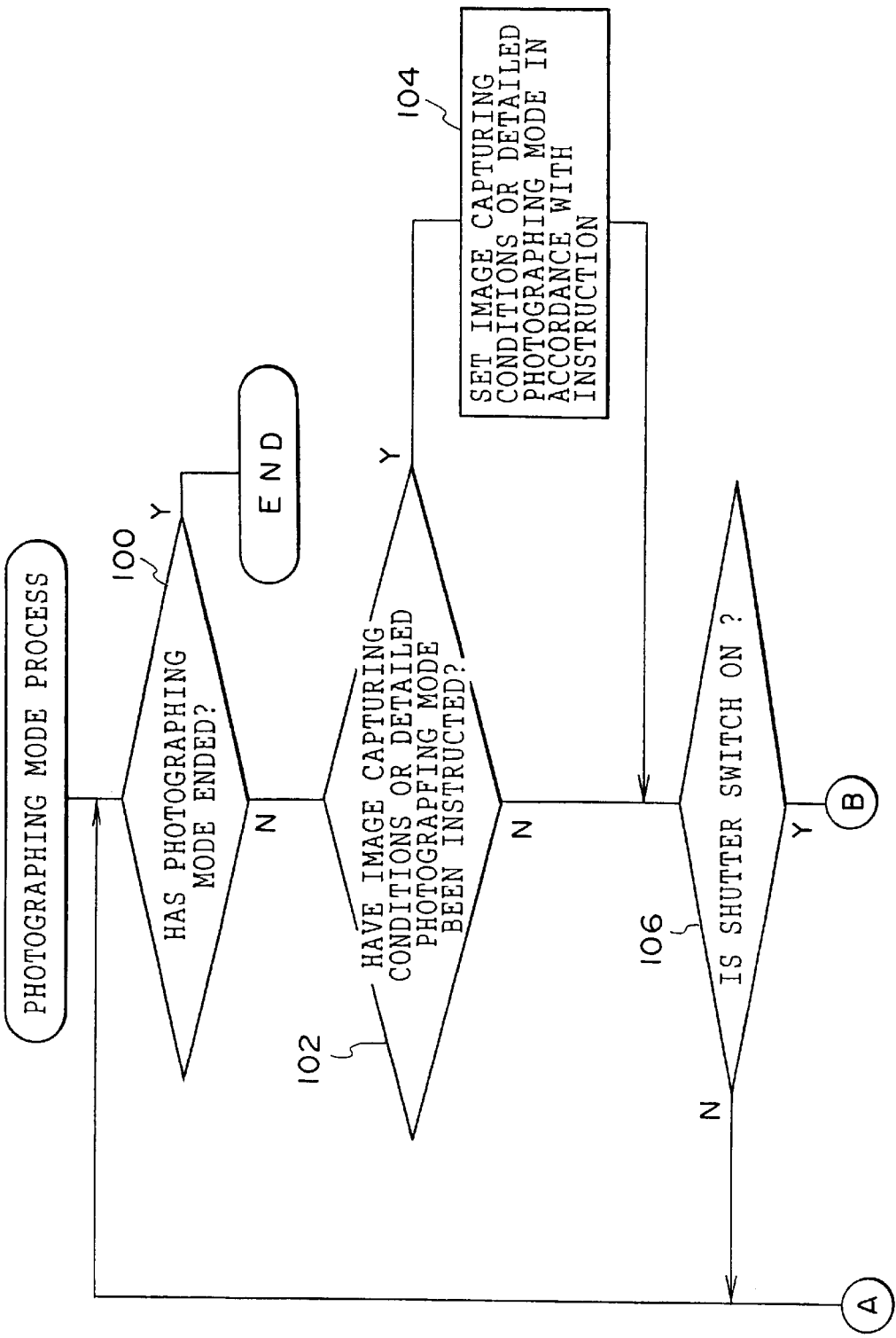

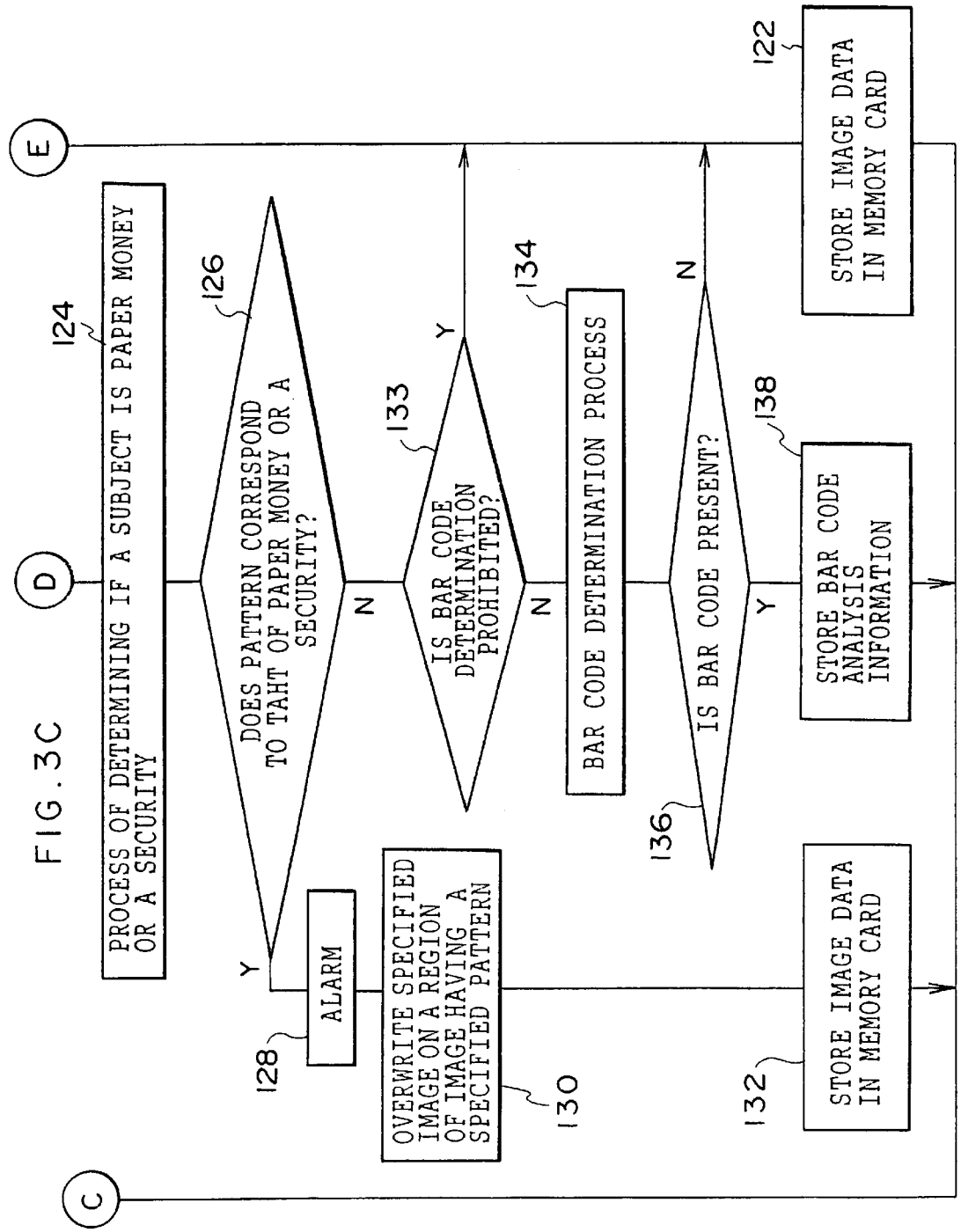

IMAGE CAPTURING DEVICE

BACKGROUND OF THE INVENTION

The present invention relates to an image capturing device, and in particular, to an image capturing device, such as a digital still camera or digital video camera, provided with an image capturing means for photographing an optical image and converting the optical image into image information.

In recent years, a digital still camera which has become popular very rapidly, is provided with an image capturing device such as a CCD, and is adapted to photograph an optical image with the image capturing device, and convert an analog image signal obtained by photographing into a digital image data, before storing the digital image data in an information storage medium (memory card) such as a smart medium. It is possible for the user to obtain a photographic print having high image quality by sending an image data obtained by photographing to a lab in order for the photographic print to be prepared or a user can easily record an image represented by the image data on paper and the like using his/her own printer.

In the image capturing device such as a digital still camera or digital video camera, the image quality of a photographed image has been improving over the years due to increased resolution and the like. However, as the image quality of a photographed image increases, there is an increased possibility that image capturing device will be used wrongly by using an image data obtained by photographing to print counterfeit paper money or counterfeit securities.

To prevent such use of an image capturing device, each time a photographing is carried out, a determination is made as to whether or not the subject whose image is captured based on image data obtained from the captured image, includes a subject which corresponds to paper money or a security. If a determination is made that a subject corresponding to a paper money or a security certificate is included an alert is given.

However a complicated image processing is necessary to make an automatic determination as to whether or not a subject corresponding to a paper money or security is included in a photographed optical image. If the determination is made each time an image is captured by a digital still camera for example, there occurs a problem of great degradation of performance of the image capturing device, due to, for example, a great increase in the interval between a time a photographing is carried out to a time when the camera is ready for a subsequent photographing.

The problem of great degradation in performance of image capturing device is not limited to the problem of determining whether or not a subject corresponding to a paper money or security is contained in a photographed optical image.

That is, a method for image capturing devices such a digital still camera is being researched in which selected information is input by using the image capturing device to photograph a medium having displayed thereon a bar-code as the selected information, and by the image capturing device analyzing the bar code based on the image data obtained from the photographing, the information represented by the bar code is input into the image capturing apparatus. However, for a determination to be automatically made as to whether or not a photographed optical image contains a subject corresponding to the medium with the bar code recorded thereon, it is necessary to perform a complicated image processing like in the case of making a decision as to whether a subject includes paper money or a security or the like. As a result the performance of the image capturing device may greatly deteriorate.

SUMMARY OF THE INVENTION

The present invention is made with such points in view. It therefore is an object of the present invention to provide an image capturing device in which a determination as to whether a predetermined subject is photographed or not can be implemented without great deterioration of performance.

To achieve the object, a first aspect of the invention provides an image capturing device comprising: an image capturing portion which photographs an optical image and converts the optical image into image information; a determination portion for deciding whether or not an image represented by image information obtained by photographing by the image capturing portion includes a predetermined pattern; a processing portion for performing a predetermined process in a case where a determination that the image includes the predetermined pattern is made by the determination portion; and a prohibiting portion which prohibits the determination by the determination portion in any case other than a case where photographing of an optical image is performed in at least one of a particular photographing mode and a particular image capturing condition suitable for photographing a subject corresponding to the predetermined pattern.

The first aspect of the invention includes a determination portion for determining whether or not an image represented by image information obtained by a photographing by the image capturing portion includes a predetermined pattern (a pattern corresponding to a subject for which whether it is to photographed or not is determined). The predetermined pattern according to the invention may for example be a pattern corresponding to a pattern of paper money or a security or may be a pattern corresponding to a bar code. A pattern corresponding to any of various documents (public document or private document) whose forgery constitutes a crime may be used as the predetermined pattern.

The determination as to whether or not an image represented by image information obtained by photographing includes a predetermined pattern may, for example, be made by a pattern matching between the image information obtained by photographing and image information representing the predetermined pattern, or by a comparison between an image characteristic amount calculated by performing a predetermined calculation (image processing) for the image information obtained by photographing and an image characteristic amount obtained by performing a predetermined calculation (image processing) for the image information representing the predetermined pattern.

The first aspect of the invention includes a processing portion for performing a predetermined process in a case a determination that the image includes the predetermined pattern is made by the determination portion.

In a second aspect of the invention, in a case where the predetermined pattern is a pattern corresponding to a paper money or a security, the processing portion performs, as the predetermined process, a process for preventing use of image information obtained by a photographing.

Thereby, image information obtained by photographing a paper money or security by an image capturing device according to the invention can be prevented from being used for a wrong practices such as making counterfeit paper money or a security.

The process for preventing use of image information may be performed, more specifically, by issuing an alert for example. A third aspect of the invention, however, performs a deletion of the image information or a processing of the image information (such as by overwriting a predetermined image on part of or the entire area of a region corresponding to the predetermined pattern in an image, for example).

Thereby, image information obtained by photographing a paper money or a security by an image capturing device according to the invention can be prevented from being used for a wrong practice such as for making counterfeit paper money or securities.

In a case where the predetermined pattern is a pattern corresponding to a bar code, according to a fourth aspect of the invention, the processing portion performs, as the predetermined process, recognition of information represented by the bar code and storing of the information in a memory.

Thereby, in a state in which information to be input to an image capturing device according to the invention is shown on a medium (paper or other recording medium, or medium such as a display), if the medium is photographed, image information obtained by the photographing can be based on the information to be recognized by the image capturing device and stored in the memory, thus allowing desirable information to be input to the image capturing device with ease.

For image information obtained by photographing a paper money or security to be used to make counterfeit paper money or security, it is necessary to photograph the paper money or security precisely or to perform photographing under a particular image photographing conditions that can precisely photograph the paper money or security.

Also in a case where information is input to the image capturing device by photographing a medium with a bar code displayed thereon for example, in order to allow information represented by the bar code to be accurately recognized, photographing must be performed under a particular image capturing condition such that the bar code can be precisely photographed (this image capturing condition is not always identical to an image capturing condition suitable for photographing the paper money or security).

The image capturing device may have a variety photographing modes for adequately photographing a variety of subjects.

The variety of photographing modes are different from each other in terms of whether or not a variety of processes (such as a hand shake correction process or a warp correction process for example) are executed during photographing or after photographing. During photographing, a photographing mode is selected in accordance with the type of a main subject or the like, and various processes are each performed in accordance with the selected photographing mode.

Therefore, in a case where a suitable photographing mode is selected from among various photographing modes as described above, when a subject corresponding to a predetermined pattern is photographed as a main subject, it is likely that a particular photographing mode suitable for the subject corresponding to the predetermined pattern will be selected.

For the object described, in the first aspect of the invention, a prohibiting portion prohibits the determination by the determination portion, in cases other than a case where photographing of an optical image is performed with at least one of a particular photographing mode and a particular image capturing condition suitable for photographing of a subject corresponding to the predetermined pattern.

Thereby, the determination portion makes a determination only in the case when an optical image containing a subject corresponding to the predetermined pattern (more specifically, an optical image having as a main subject a subject corresponding to the predetermined pattern) might have been photographed. As a result, a great degradation of performance of the image capturing device can be prevented when compared with a case where a determination is made by a determination portion at every photographing.

Therefore, according to the first aspect of the invention, a determination as to whether or not a predetermined subject is photographed can be implemented without a great degradation of performance.

In a fifth aspect of the invention, an image capturing device according to the first aspect further comprises a selecting portion for selecting whether to perform or not a determination on a pattern corresponding to a bar code as the predetermined pattern, and the prohibiting portion unconditionally (also in a case of a particular photographic pattern or particular photographing mode suitable for photographing a subject corresponding to a pattern corresponding to the bar code) prohibits a determination by the determination portion as to whether or not an image represented by the image information includes a pattern corresponding to the bar code in a case where the selecting portion has selected that the determination on a pattern corresponding to the bar code is not to be performed.

According to the fifth aspect, when it is selected by the selecting portion that a determination on a pattern corresponding to the bar code is not to be made, there a determination as to whether or not a pattern corresponding in image to the bar code is not made, and when a subject containing the bar code is photographed without aiming to have recognized information represented by the bar code, great degradation of performance of the image capturing device can be prevented.

In a sixth aspect of the invention, as the particular image capturing condition, there is employed an image capturing condition in which optical images spaced at a smaller distance than a predetermined value are photographed by dividing the image into a greater number of pixels than predetermined.

The above image capturing condition is an image capturing condition that can precisely photograph a main subject: Thus, in photographing of a paper money or security with a purpose for making counterfeit money securities, or in photographing of (a medium with) a bar code (indicated thereon) with a purpose of inputting information, it is likely that a photographing is made with above-noted image capturing condition to obtain image information that precisely represents the main subject (paper money or security, bar code, etc.).

Therefore, by using an image capturing condition like above as a particular image capturing condition, just in a case where it is possible that an optical image containing a subject corresponding to the predetermined pattern might have been photographed, there can be made a determination as to whether or not an image includes the predetermined pattern.

In paper money, security, or such, the portion having relatively low concentration has a relatively great area, and the low-concentration portion contains some visible information recorded (for example, it is colored or has a certain pattern recorded, etc.).

Therefore, in photographing of an optical image including a paper money, security, etc. as a main subject, a strobo may be flashed and the visible information in the low-concentration portion is likely to be lost from the image information due to a saturation of light quantity. In consideration of this point, in a case a pattern corresponding to a paper money or security is the predetermined pattern, the sixth aspect of the invention may have, as a particular image capturing condition according to the invention, an additional condition that the strobo is not to flash.

On the other hand, the code bar is a binary-value image constituted with combinations of a bar (black portion) and a space (white portion), and it is referable for an improved recognizability to increase a contrast of an image represented by image information by flashing a strobo when photographing. Therefore, in a case a pattern corresponding to a paper money or security is the predetermined pattern, the sixth aspect of the invention may have, as a particular image capturing condition according to the invention, an additional condition that the strobo is to flash.

A seventh aspect of the invention employs, for example, a document copy mode for performing, when photographing an optical image including a sheet material, a process for obtaining image information accurately representing visible information (for example, character, figure, color pattern, etc.) recorded on the sheet material.

In a case where the image capturing device according to the invention is provided the above document copy mode, it is highly probable that the document copy mode is selected when photographing a paper money or security with a purpose of making counterfeit copies or in a photographing of (a medium with) a bar code (indicated thereon) with a purpose of inputting information. Therefore, by using a document copy mode like above as a particular photographing mode, just in a case where it is possible to make a determination that an optical image containing a subject corresponding to a predetermined pattern might have been photographed, there can be made a determination as to whether or not an image includes the predetermined pattern, in an ensured manner.

As the document copy mode, more specifically, there can be employed for example a process for performing, for image information obtained by photographing or when photographing, a hand shake correction process or warp correction process, or a process for distributing a main subject to be photographed (document as to be copied) over an entire area of an image (for example, a process for selecting a photographic frame when photographing, or a process for cutting out a region corresponding to a main subject of a photographic target from image information obtained by photographing).

BRIEF DESCRIPTION OF THE DRAWINGS

FIGS. 3A to 3C are flowcharts showing contents of a photographing mode process to be executed in the digital still camera according to the embodiment of the invention.

DETAILED DESCRIPTION OF THE PREFERRED EMBODIMENT

Figure 1A:
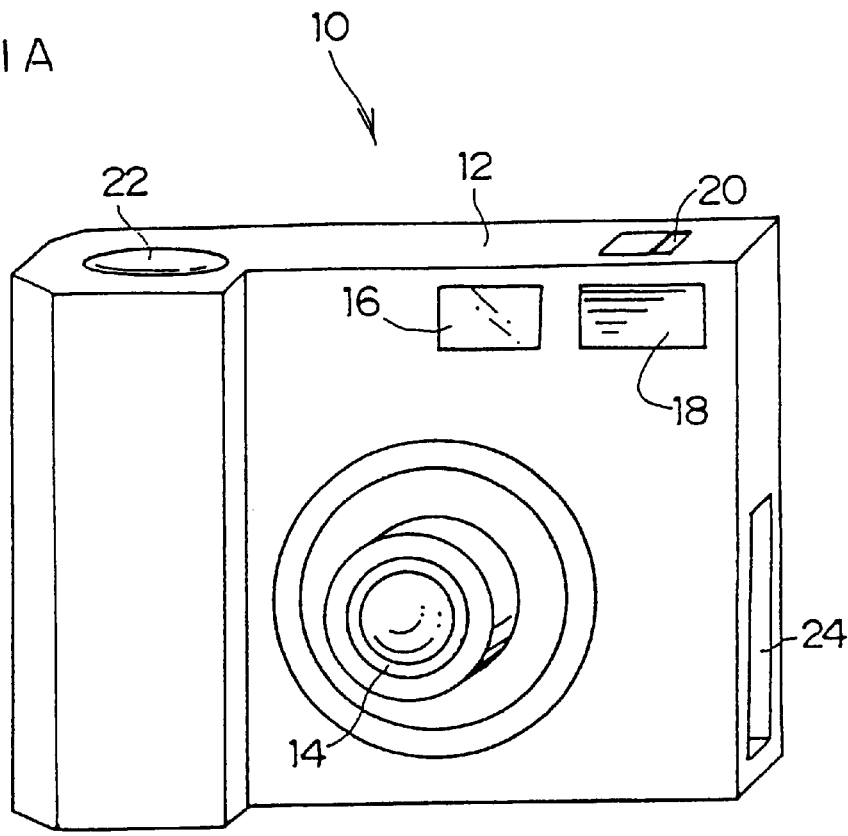
FIG. 1A is a perspective view at a front side of a digital still camera according to an embodiment of the invention.
Figure 1B:
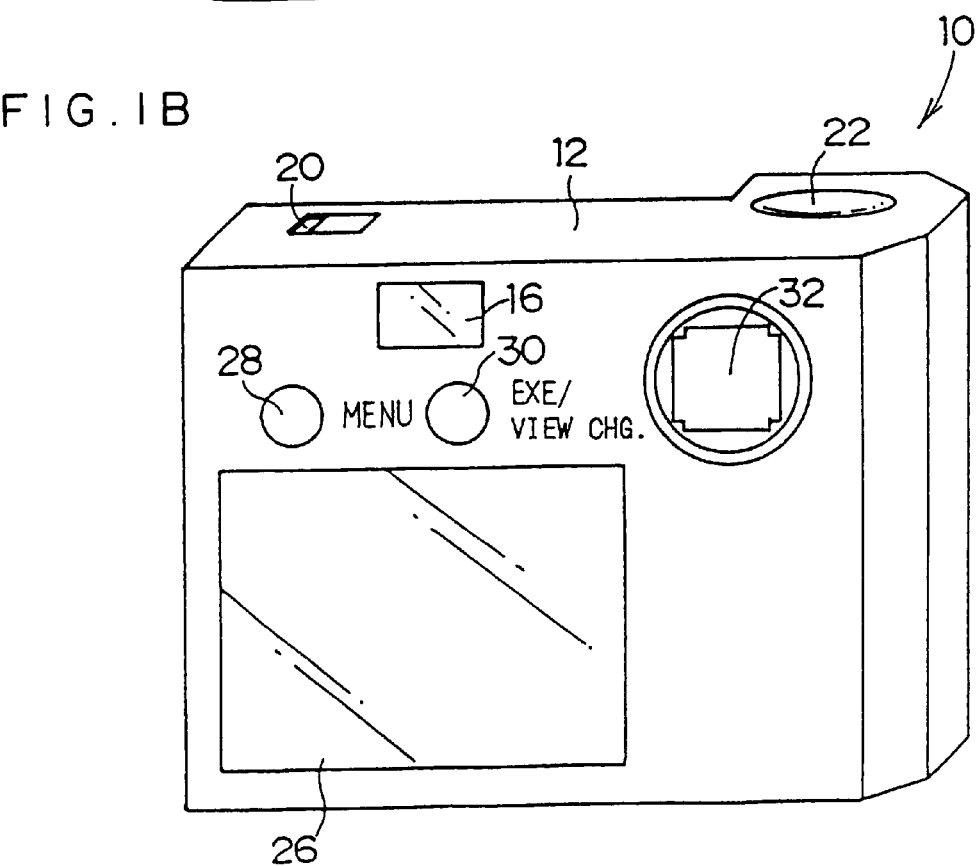
FIG. 1B is a perspective view at a backside of the digital still camera according to the embodiment of the invention.

There will be detailed below a preferred embodiment of the present invention with reference to the accompanying drawings. FIG. 1A and FIG. 1B show a digital still camera 10 as an image capturing device according to the embodiment of the invention.

As shown in FIG. 1A and FIG. 1B, the digital still camera 10 has a body 12 configured substantially in a box-shape which is formed, at the left side when viewed from the front, with a protrusion (as a grip) for easy grasp of the body 12.

As shown in FIG. 1A, in the middle of front of the body 12 is mounted a lens 14, and above the lens 14 of the body 12 are mounted an optical finder 16 so the user can visually check a photographing range and the like, and a strobo flash 18 for emitting auxiliary light in the case of a photographing with low illuminance.

As shown in FIG. 1B, the body 12 has mounted, on a lower portion of the backside, a color display 26 (which may be a monochromatic display) formed of a reflective display device or transparent display device (for example, an LCD), and at an upper side of the display 26, a menu switch 28, an execution/screen switching switch 30, and an operation switch 32.

Figure 2:
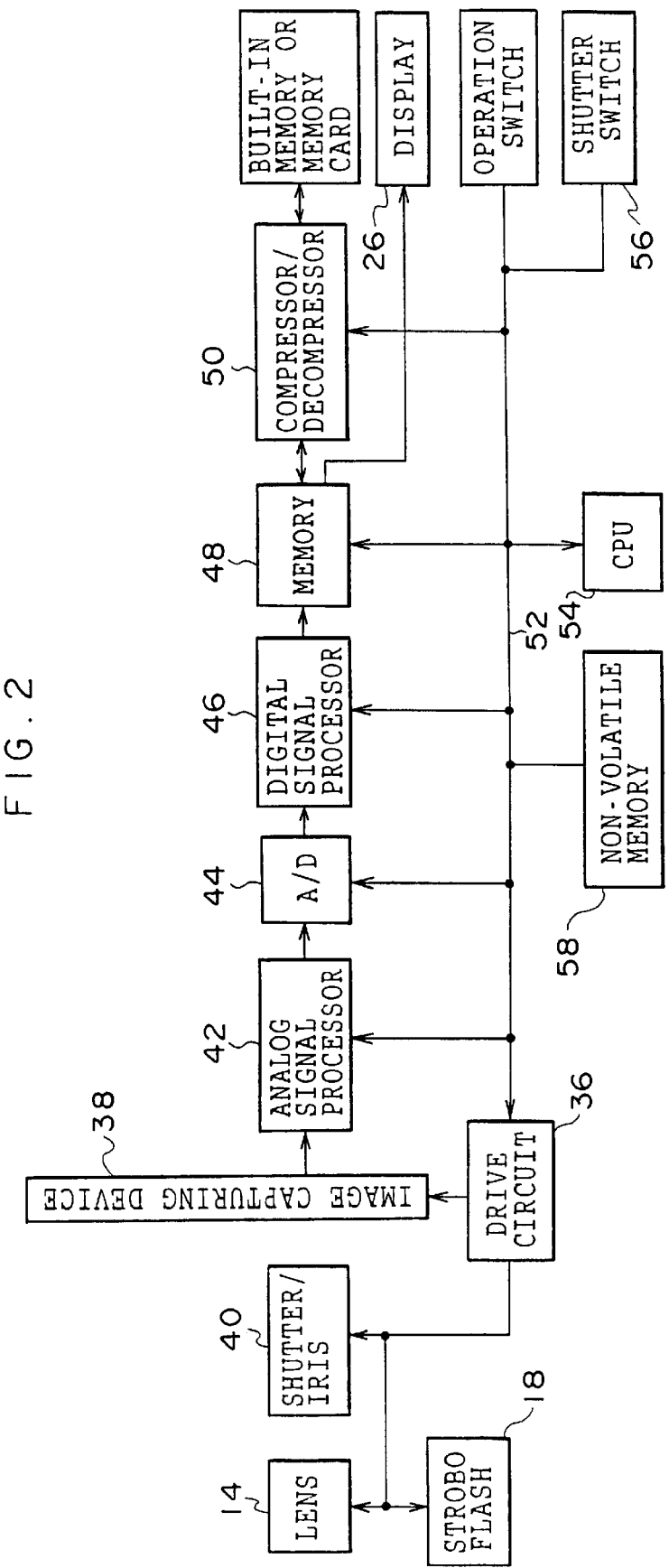
FIG. 2 is a block diagram showing a schematic arrangement of an electrical system of the digital still camera shown in FIG. 1A and FIG. 1B.

FIG. 2 shows an electrical system of the digital still camera 10. The lens 14 is formed as a zoom lens (a lens having variable focal length) provided with an auto-focus (AF) mechanism. The AF mechanism as well as a zoom mechanism of the lens 14 is driven by a drive circuit 36.

The zoom lens may preferably be substituted by lens having a fixed focal length provided only with an AF mechanism, and used as the lens 14.

The body 12 has therein a photographic device 38 formed by use of an area CCD sensor and the like, at a location corresponding to a focal point of the lens 14, so that light reflected from a subject of photographing and entered into the lens 14 is focused on a light receiving surface of the photographic device 38. The photographic device 38 is driven at a timing in synchrony with a timing signal generated by an incorporated timing generator (not shown) in the drive circuit 36, to output an image signal (a signal representing an amount of received light at each one of multiple photoelectric conversion cells arranged in a matrix on the light receiving surface).

Between the lens 14 and the photographic device 38 is disposed a shutter and iris 40, which are driven by the drive circuit 36. The shutter prevents a smear from being caused by light incident on the light receiving surface of the photographic device 38 when an image signal is output from the photographic device 38, and may not be provided for some type of photographic device 38.

The iris may be formed as a single iris having a continuously variable reduction amount, or with a plurality of irises having different reduction amount.

The drive circuit 36 is connected to the strobo flash 18, as well. The strobo flash 18 is driven by the drive circuit 36, to emit light when a low illuminance is detected, as well as when an instruction for emission of light is given by the user.

The photographic device 38 has, at its signal output end, an analog signal processor 42, an A/D converter 44, a digital signal processor 46, and a memory 48 connected thereto in that sequence. The analog signal processor 42 amplifies an image signal output from the photographic device 38, as well as carries out corrections such as a white balance correction of an amplified image signal.

An image signal output from the analog signal processor 42 is converted by the A/D converter 44 into a digital image signal to be input to the digital signal processor 46. At the digital signal processor 46 are performed various processes such as color correction, Y correction, and Y/C conversion.

An image data output from the digital signal processor 46 is temporarily stored in a memory 48 formed of a RAM or the like.

The image data stored in the memory 48 corresponds to image information according to the invention. A combination of lens 14, image capturing device 38, analog signal processor 42, A/D converter 44, and digital signal processor 46 corresponds to an image capturing means according to the invention.

The drive circuit 36, the analog signal processor 42, the A/D converter 44, the digital signal processor 46, the memory 48, and a compressor/decompressor 50 (described later) are connected to a bus 52. The bus 52 is connected to a CPU 54 and a non-volatile memory 58 whose stored contents are rewritable (for example, a RAM connected to a backup power supply or EEPROM), and has individual connections to switches (collectively described as "operation switch" in FIG. 2), such as a power supply switch 20, menu switch 28, execution/screen switching switch 30, and operation switch 32, as well as to a shutter switch 56 to be turned on and off by operations of a shutter button 22.

The CPU 54 is comprised of peripheries such as ROM, RAM, and input/output ports not shown in the figure.

The memory 48 is connected to the display 26 and the compressor/decompressor 50 respectively. In order to display an image on the display 26, the CPU 54 transfers an image data temporarily stored in the memory 48 to the display 26. An image represented by the image data temporarily stored in the memory 48 is thereby displayed on the display 26. When an instruction is given for storage of an image data to a memory card inserted in a slot 24, such as by an operation of the shutter button 22 which thereby turns the shutter switch 56 on, the CPU 54 reads an image data temporarily stored in the memory 48 and then transfers to it the compressor/decompressor 50.

The image data is thereby compressed at the compressor/decompressor 50, and then stored in the memory card.

In an photographing mode or the like, image data may be stored in the memory card without being compressed.

When an instruction is given for reproduction (display) of an image represented by an image data stored in the memory card inserted in the slot 24, the image data is read from the memory card, and if the read image data has been compressed and stored, the compressed image data is decompressed at the compressor/decompressor 50, to be temporarily stored in the memory 48.

Then, the image data temporarily stored in the memory 48 is used to display (reproduce) an image on the display 26.

Figure 3B:
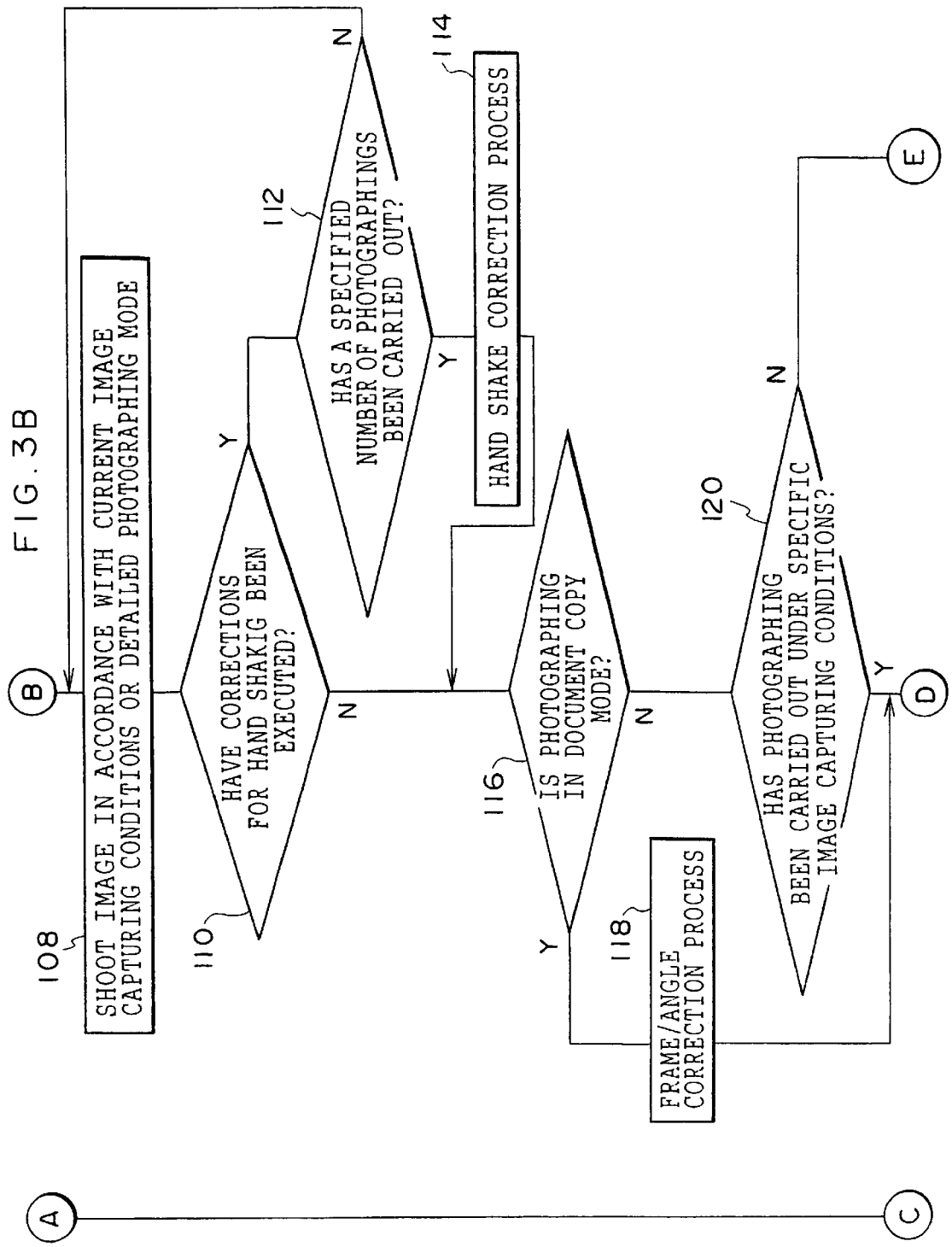

Next, with reference to flowcharts of FIGS. 3A to 3C, an application of the present embodiment will be described where a process of the photographing mode to be executed at the CPU 54 in a case when a photographing mode for photographing an image is instructed as a processing mode of the digital still camera 10.

At a step 100, a determination is made as to whether photographing mode has been instructed to end or not.

If the determination is negative, the control flow goes to a step 102, where another determination is made as to whether or not an image capturing condition has been specified by the user or a detailed photographing mode (a mode provided for photographing a particular kind of subject) is specified.

If this determination is negative, the control flow goes to a step 106, where another determination is made as to whether or not the shutter switch 56 is turned on by operating the shutter button 22. If this determination is negative, the control flow returns to the step 100, and the steps 100, 102, and 106 are repeated.

An image capturing condition of the digital still camera 10 is predetermined by various parameters such as a resolution (number of pixels) when photographing, a photographing distance, a strobo flash, an AE mode, a highlight portion photographing condition, and an auto-white balance.

Of these parameters, for example, the "resolution when photographing" as well as the "photographing distance" is a desirable value suitably selected from among a plurality of predetermined values, and the "strobo flash" is any of the menu options {flash, no flash, and automatic flash}.

The "AE mode" is any of menu options of {iris priority and shutter speed priority}.

The "highlight portion image capturing condition" is any of menu options of {saturated photographing, unsaturated photographing}.

The "auto-white balance" is suitably selected from menu options of {on and off}.

The user sets up parameters for specifying the image capturing conditions in accordance with for example a type of a main subject or the like.

Setting of the image capturing condition by the user can for example be performed as follows. When a desirable image capturing condition is to be set, the user turns on the menu switch 28. When it is detected that the menu switch 28 is turned on, the CPU 54 takes from the non-volatile memory 58 into the memory 48 information representing predetermined items to be displayed when the menu switch 28 is turned on, and responds to the information taken in by displaying the predetermined items in a list on the display.

The items to be then displayed indicates titles of processes executable in accordance with an instruction by the user, and in this embodiment, there are displayed on the display 26 the respective items of "image capturing condition" and "detailed photographing mode", in addition to those items to be generally displayed on the digital still camera 10 when the menu switch 28 is turned on.

A user who wishes to set a desirable image capturing condition selects the "image capturing condition" from among the items displayed in a list. The operation switch 32 at the backside of the body 12 of the digital still camera 10 has switches provided in correspondence with upper, lower, left, and right ends respectively of the substantially rectangular-shaped button.

When an end of the button is pressed, a corresponding switch is turned on.

For a particular item to be selected from a displayed list of items, the user turns on an upper switch or lower switch of the operation switch 32 on, thereby moving a cursor, and when the cursor matches the particular item, turns the execution/screen switching switch 30 on.

As selection of the "image capturing condition" is detected, the CPU 54 takes from the non-volatile memory 58 into the memory 48, information to be displayed when the "image capturing condition" is selected (a title of each parameter specifying the image capturing condition and a title of a menu option of each parameter).

It displays on the display 26 a title of each parameter and a menu option of each parameter represented by the information taken in.

It responds to a currently set image capturing condition by displaying a menu option for each parameter in correspondence to the currently set image capturing condition, so that it is distinguished from other menu options (for example, by highlighting or the like).

By reference to a screen with a displayed list of titles of each parameter and the menu options (an image capturing condition setting screen), the user decides a particular parameter in which a menu option corresponding to the currently set image capturing condition is different from a menu option to be selected in order to achieve a desired image capturing condition. The user then operates the operation switch 32 and the execution/screen switching switch 30, thereby selecting, from among menu options displayed in correspondence to the particular parameter, a desired menu option that is different from the currently selected menu option.

The determination at the step 102 then becomes affirmative, and the control flow goes to a step 104, where the CPU 54 changes the setting of the image capturing condition in accordance with a menu option selected by the user.

As above, the user may set a desired image capturing condition by selecting a menu option for a respective parameter as a unit specifying the image capturing condition. However, the user may also carry out the setting in advance such that a plurality of kinds of image capturing conditions in which an adequate menu option is selected for each parameter in correspondence to various main subjects. The plurality of kinds of image capturing conditions are provided with their titles, and a title of a desired image capturing condition may be selected by the user, thereby allowing the user to set the desired image capturing condition.

There are provided a plurality of kinds of detailed photographing modes, such as a "person photographing mode" or "document copy mode", respectively as the detailed photographing mode of the digital still camera 10.

The "document copy mode" is a detailed photographing mode provided, to be used when photographing as a main subject a document with recorded characters as well as illustrations or a medium with a recorded bar code. The "document copy mode" is for photographing with details, characters as well as bar codes (corresponding to visible information in the seventh aspect) recorded in the document or the medium. The "document copy mode" is adapted, in order to prevent degradation of image quality due to a hand shake when photographing, for controlling an operation timing of an electronic shutter mechanism to make the shutter speed high when photographing, for performing a hand shake correction process (detailed later) to a photographed image, for correcting a size of a subject on an image so that a main subject (such as a bar code record region on a document or medium) of an object to be photographed is distributed over substantially an entire area of the image, and for performing a frame/angle correction process to correct a geometric distorsion of image due to misalignment of the digital still camera 10 relative to a subject when photographing.

On the other hand, the "person photographing mode" is a detailed photographing mode which does not perform control of operation timing of the electronic shutter mechanism, hand shake correction process, nor frame/angle correction process. Note that descriptions of other detailed photographing modes are omitted.

A user who wishes to set a desired photographing mode to be set as a detailed photographing mode turns the menu switch 28 on, and selects the "detailed photographing mode" from among a list of items thereby displayed on the display 26.

As the user's selection of the "detailed photographing mode" is detected, the CPU 54 takes from the non-volatile memory 58 into the memory 48, information representing titles of all detailed photographing modes, and displays on the display 26 a list of titles of respective detailed photographing modes represented by the information taken in, and a title of a currently set detailed photographing mode is displayed so as to be distinguished from other detailed photographing modes (for example, by highlighting or the like).

Given a displayed list of titles of detailed photographing modes, the user operates the operation switch 32 and the execution/screen switching switch 30, thereby selecting a title of the desired photographing mode. The determination at the step 102 becomes affirmative, and the control flow goes to the step 104, where the CPU 54 changes the setting of the detailed photographing mode in accordance with the selected title.

When the image capturing condition or the detailed photographing mode is re-set at the step 104, the control flow goes to a step 106. Therefore, until a determination at the step 106 becomes affirmative, each time when an image capturing condition or detailed photographing mode is designated (a re-set is instructed), the control flow goes from the step 102 at which the determination becomes affirmative to the step 104, where a new image capturing condition or detailed photographing mode is set.

When the shutter switch 56 is turned on by operation to the shutter button 22, the determination at the step 106 becomes affirmative and the control flow goes to a step 108, where an image is photographed in accordance with a currently set image capturing condition and detailed photographing mode.

In other words, there is first taken in an image data that has been stored in the memory 48 by photographing by the photographic device 38, and on a basis of the image data, there is performed an AE process for automatically determining an exposure in accordance with an "AE mode" and other currently set image capturing conditions. Then, based on a result of the AE process, a shutter speed (as a charge storage time at the photographic device 38) and a reduction amount at the iris are determined in consideration of other parameters of the currently set image capturing condition, and the operation timing of the electronic shutter mechanism of the photographic device 38 is controlled and the iris is driven via the drive circuit 36.

Next, an AF process for detecting a focus position (as a lens position in a focused state) is carried out based on the "photographing distance" which is one of the currently set image capturing conditions. Then, in accordance with the lens position at the focus position detected by the AF process, a stepping motor of the AF mechanism of the lens 14 is driven to achieve a focus condition (the focused state), and a subject (an optical image) is photographed by the photographic device 38 in the focus condition.

An image data obtained by the photographing is stored in the memory 48.

If "flash" is selected at the item of "strobo flash" of the currently set image capturing condition or if "automatic" is selected at "strobo flash" and a determination is made that flashing of the strobo flash is necessary in the AE process, the strobo flash 18 also is controlled so as to flash concurrently with the photographing.

After the photographing of an image, the control flow goes to a step 110 for a determination as to whether a hand shake correction process is to be performed or not.

If the hand shake correction process is unnecessary, the above-noted determination becomes negative and the control flow goes to a step 116. However, if it is necessary to perform the hand shake correction process in a currently set detailed photographing mode, such as the "document copy mode", the determination at the step 110 becomes affirmative and the control flow goes to a step 112 for a determination as to whether or not a photographing of an image is performed a predetermined number of times (twice or more).

If the determination at the step 112 is denied, the control flow returns to the step 108. Thereby, in the case the hand shake correction process is performed, the same subject is consecutively photographed a predetermined number of times.

As the same subject is photographed a predetermined number of times, the determination at the step 112 becomes affirmative and the control flow goes via the step 114, where a hand shake correction process is performed to correct a hand shake in the photographing, to the step 116.

The hand shake correction process may for example be performed as follows.

Image data of a predetermined number of images obtained by a predetermined number of photographing and photographing times stored in correspondence to the individual image data are taken in the memory 48.

Based on the photographing time taken in, a determination is made as to the order of photographing of a respective image data.

Then, by comparing image data of a pair images which are next to each other in terms of photographing order (an image of an $n^{th}$ photographing and an image of an $n+1^{th}$ photographing), there is estimated a direction of a hand shake in the photographing and an amount of the hand shake (a direction and a distance of a pixel corresponding to a particular portion of a subject on an image previously photographed of a pair of images, relative to a position of a reference pixel corresponding to the particular portion on the other image) for each of the predetermined number of images. Then, based on the estimated direction and amount of hand shake, image data of the predetermined number of images are individually corrected so that a pixel corresponding to the same portion of the subject is located at the same position on each of the predetermined number of images.

With respect to the corrected image data of the predetermined number of images, an average concentration of each of R, G, and B is calculated for every pixel to thereby synthesize the predetermined number of image data.

Thereby obtained is a single image data in which hand shake at the time of photographing is corrected.

At the step 116, a determination is made as to whether or not a current photographing is performed under a condition with the document copy mode (a particular photographing mode) set as a detailed photographing mode.

If this determination is denied, the control flow goes to a step 120 for a determination as to whether the current photographing is performed under a particular image capturing condition. In this embodiment, the particular image capturing condition is, among various parameters specifying an image capturing condition, a combination of the "resolution (number of pixels) when photographing" is 1000× 1000 or more and the "photographing distance" is within 1 m.

This image capturing condition corresponds to a particular image capturing condition according to the sixth aspect of the invention.

In a case the determinations at the step 116 and the step 120 are respectively denied, the image capturing condition or detailed photographing mode in the current photographing is not an image capturing condition or detailed photographing mode in which a precise photographing can be carried out such as that of a paper money or security or bar code (but such as by a "photographing distance" of several meters or more or in a detailed photographing mode to be "person photographing mode" or the like), and it can be judged that an optical image of the current photographing does not contain a subject corresponding to a paper money or security nor a subject corresponding to a medium with a recorded bar code, or even when such a subject is contained, a paper money or security contained in an image represented by an image data obtained by the photographing or a region corresponding to a medium with a recorded bar code is low in degree of clearness, so that it is difficult to use the image data obtained by the photographing for making counterfeit paper money or securities or for recognition of information represented by the bar code.

Therefore, in this case also the determination at the step 120 is denied, the control flow goes, without performing a later-described paper money/security determination process (step 124) or a bar code determination process (step 134), to a step 122 for storing the image data obtained by the current photographing from the memory 48 to the memory card, and returns to the step 100.

Like this, when in an image capturing condition or detail photographing mode capable of judging a photographing not to be a photographing for making counterfeit paper money or securities nor to input information represented by a bar code, because a paper money or security determination process or bar code determination process that is complicated and time-consuming is not performed, it is possible to prevent a degradation of performance, such as a great increase in time it takes to reach a condition in which a subsequent photography is possible, after a photography has been carried out.

The step 116 and the step 120 correspond to a process at a prohibiting portion in the first aspect of the invention.

On the other hand, in a case the current photographing is made under a condition with the document copy mode set as a detailed photographing mode, the control flow goes from the step 116, where the determination becomes affirmative, to the step 118 for a frame/angle correction process for correcting a size of a subject on an image so that a main subject (a document or bar code record region on a medium) as a target of photographing is distributed over an area of the image and correcting a geometric distortion of an image due to misalignment of the digital still camera 10 relative to the subject when photographing.

This frame/angle correction process may for example be performed as follows.

Figure 4C:
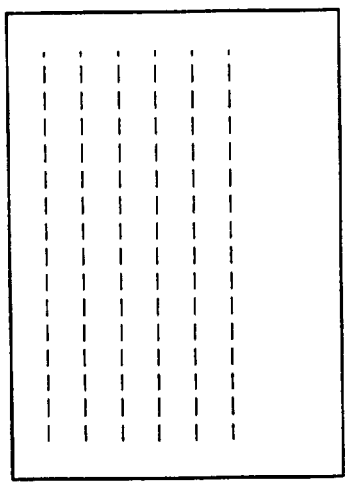
FIGS. 4A to 4C are imaginary diagrams for describing an example of a frame/angle correction process in the embodiment of the invention.
Figure 4B:
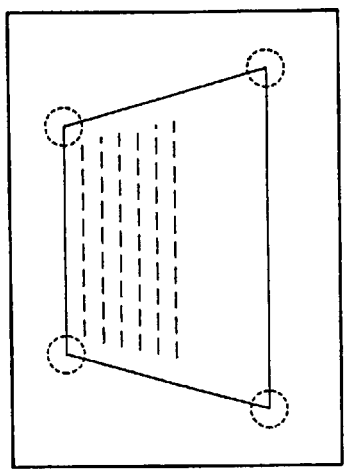
Figure 4A:
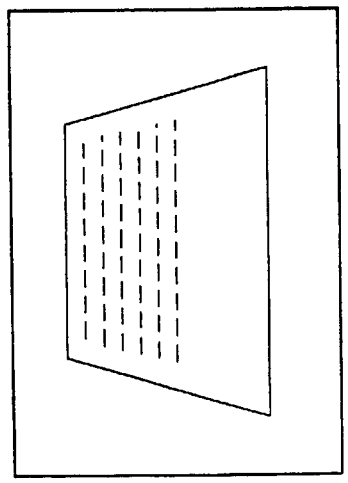

First, the CPU 54 responds to an image data obtained by the current photographing and stored the memory 48, by displaying an image represented by the image data, as shown as an example in FIG. 4A. FIG. 4A shows an image in which a document to be copied by use of a document copy mode is photographed as a main subject. However, because the photographing is made by the digital still camera 10 in a state in which it is not properly aligned to the document, a region corresponding to the document is distorted, and further because the photographing is made by the digital still camera 10 located at a position relatively distant from the document, an allowance region relatively wide in area is caused about a region corresponding to the document.

When displaying such an image, the CPU 54 displays on the display 26 a message requesting the user to designate on a display surface of the display 26 positions of corner portions corresponding to a main subject in the displaying image in order to recognize an outline position of a region corresponding to the main subject in the displaying image.

The user is thereby able to designate the positions of the corner portions.

By operating the execution/screen switching switch 30 and the operation switch 32, for example, the user designates positions of four corner portions in a region corresponding to the main subject enclosed for example by dotted lines in FIG. 4B.

The CPU 54 is adapted, when the positions of the four corner portions in the region corresponding to the main subject are designated by the user, first to recognize addresses of image data of pixels corresponding to the designated corner portions in accordance with positions of the designated four corner portions on the display surface of the display 26, and on bases of addresses of the recognized pixels, to perform a cutout of image data of a region corresponding to the main subject.

Then, it performs on the cutout image data a correction of geometric distortion so that an outline configuration of an image represented by the cutout image data becomes rectangular with a predetermined aspect ratio, and further performs a pixel density conversion so that the pixel density of image data after the distortion correction has a predetermined high density.

By the above frame/angle correction process, an image based on image data after the correction process is displayed on the display 26 so that, as shown in FIG. 4C for example, a region corresponding to a document as the main subject is displayed substantially in an entire area of the display 26, as an image free of geometric distortion.

After the frame/angle correction process at the step 118, the control flow goes to a step 124. In a case where the current photographing is performed under a particular image capturing condition, the determination at the step 120 becomes affirmative, and the control flow goes to the step 124 without particular processing.

In a case where the determination at the step 116 or the step 120 becomes affirmative, the image capturing condition or detailed photographing mode in the current photographing is an image capturing condition or detailed photographing mode in which a precise photographing of a paper money or security or of a bar code can be carried out. If the currently photographed optical image contains a subject corresponding to a paper money or security or a subject corresponding to a medium with a recorded bar code, the image represented by image data obtained by the photographing contains a region that can display the paper money or security or the bar code with good precision.

Therefore, in the case where the determination at the step 116 or the step 120 becomes affirmative, it is probable that a paper money or security may be photographed for making counterfeit money or that a medium with a bar code recorded such as for inputting information to the digital still camera 10 may be photographed, and first at a step 124 is performed a paper money or security determination process for a determination as to whether or not a paper money or a security is photographed as a subject.

This step 124 as well as a subsequent step 126 corresponds to a process at a determination portion according to the first aspect of the invention.

The paper money or security determination process can for example be performed by storing in advance in the non-volatile memory 58 an image data for determination obtained by photographing a paper money or security for which the determination is to be carried out (corresponding to a predetermined pattern in the invention), performing a pattern matching between the image data for which the determination is to be carried out which is obtained by photographing and an image data taken from the non-volatile memory 58 into the memory 48 to calculate a degree of match between images represented by the two image data, and making a determination as to whether or not the degree of match is greater than a predetermined value.

The paper money or security determination process may for example be performed by storing in advance in the non-volatile memory 58 a result of a predetermined calculation (for example, a Fourier conversion process) on the image data for determination, performing a predetermined calculation on the image data for determination obtained by photographing, by comparing a result of the calculation on the image data for determination with a result of calculation on the image data for determination, as it is taken from the non-volatile memory 58 into the memory 48, to thereby calculate a degree of match between images represented by the two image data, and making a determination as to whether or not the degree of match is greater than a predetermined value.

At the subsequent step 126, based on a result of the paper money or security determination process at the step 124, a determination is made as to whether or not a pattern corresponding to the paper money or security exists in an image represented by the image data for which the determination is to be made. In a case such as that the image represented by the image data for which the determination is to be made is an image obtainable by photographing the paper money as a main subject, as shown in FIG. 4D for example, the determination at the step 126 becomes affirmative and the control flow goes to a step 128, where an alarm is given to the user. This alarm may simply be an alarm sound given by a buzzer and the like, or may be performed by displaying on the display 26 a message informing that the image data obtained by photographing will be processed in order to prevent production of counterfeit of paper money or security.

At a subsequent step 130, the image data for which the determination is to be made is processed so that, in the image represented by the image data for which the determination is to be made, a region in which a predetermined pattern corresponding to the paper money or security exists is replaced by a predetermined image to be overwritten (a data representing a concentration of each of R, G, and B at each pixel corresponding to the above-noted region is rewritten by a data representing a concentration of each of R, G, and B at each pixel corresponding to the predetermined image). In place of overwriting a predetermined image as described above, there may be performed a calculation to a region in which for example a predetermined pattern exists, for reducing for example the clearness (for example, a calculation corresponding to a low-pass filter), or such a calculation as for applying mosaics. This step 130 correspondents to a process at a processor according to the invention.

At a subsequent step 132, an image data after the process at the step 130 is stored in the memory card, and the control flow returns to the step 100. An image data obtained by photographing a paper money or security as a main subject is thereby prevented from being used for making counterfeit paper money or securities. In place of the process at the step 130, there may be performed a process for deleting (destruction) the image data obtained by the current photographing.

In a case where it is decided that a pattern corresponding to the paper money or security is absent in the image represented by the image data as the target for determination, the determination at the step 126 is denied and the control flow goes a step 133 for determination as to whether or not a determination on a bar code is prohibited by the user.

In this embodiment, it is possible by operation for example of the execution/screen switching switch 30 as well as of the operation switch 32 for the user to give an instruction in advance to, or not to, prohibit a determination on a bar code.

For example, usually (in a case where no photographing is to be made of a medium with a bar code recorded for a purpose of inputting information represented by the bar code to the digital still camera 10), the user can operate the execution/screen switching switch 30 as well as the operation switch 32 to thereby prohibit a determination on a bar code.

In a case of a photographing to be made of a medium as a subject with a bar code recorded for a purpose of inputting information represented by the bar code to the digital still camera 10), there is given an instruction for making a determination on the bar code.

Content of this instruction is stored in the non-volatile memory 58. At the step 133, based on the content of the instruction stored in the non-volatile memory 58, a determination is made as to whether or not the determination on the bar code is prohibited.

In a case the determination at the step 133 becomes affirmative, it can be decided that the current photographing is not a photographing aiming at inputting information represented by the bar code, and the control flow goes to the step 122, where the image data obtained by the current photographing is stored in the memory card, and returns to the step 100.

Like this, in the case a determination on a bar code is prohibited by the user, the bar code determination process is not performed irrespective of which detailed photographing mode or image capturing condition is set for the current photographing, and it is possible to prevent degradation of performance such as a great increase in time of an interval from a time of a photographing to a time when a subsequent photographing is possible.

As described above, the execution/screen switching switch 30 as well as the operation switch 32 corresponds to a selecting portion of the fifth aspect of the invention, and the step 133 corresponds to a prohibiting portion therein.

On the other hand, in the case the instruction to make a determination on the bar code is given, the determination at the step 133 is denied and the control flow goes to a step 134, where a bar code determination process is performed to make a determination as to whether or not a medium with a recorded bar code as a subject is photographed in the current photographing. This step 134 as well as a subsequent step 136 corresponds to a determination portion in the invention.

This bar code determination process can for example be performed by calculating, on a basis of an image data for which the determination is to be made, which is obtained by photographing, an image characterizing amount represented by the image data (for example, a maximal concentration and a minimal concentration, or a concentration histogram, etc), by responding to the image characterizing amount to determine a threshold value for converting the image data for which the determination is to be made into a binary value and use the threshold value for binary-coding of the image data for which the determination is to be made, by detecting, on an image data after the binary-coding, a region in which a white portion and a black portion with pixel widths smaller than a predetermined value repeatedly appear in a certain direction (a pattern corresponding to the bar code: corresponding to a predetermined pattern in the invention), and by making a determination as to whether the region is present or not.

At a subsequent step 136, on a basis of a result of the bar code determination process at the step 134, a determination is made as to whether or not a pattern corresponding to the bar code is present in an image represented by the image data of the determination target.

In a case the determination at this step 136 is denied, the determination at the above-noted step 126 also is denied, with a possible determination that the current photographing has not photographed any paper money or security, nor any medium with a recorded bar code, and the control flow goes to the step 122, where an image data obtained by the current photographing is stored in the memory card, and returns to the step 100.

Figure 4E:
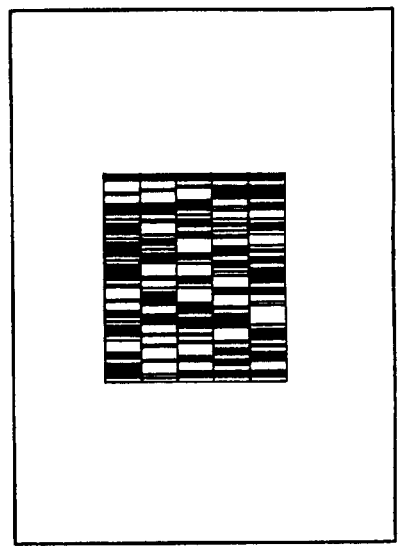
FIG. 4E is an image illustration showing an example of an image to be obtained by photographing a two-dimensional bar code in the embodiment of the invention.
Figure 4D:
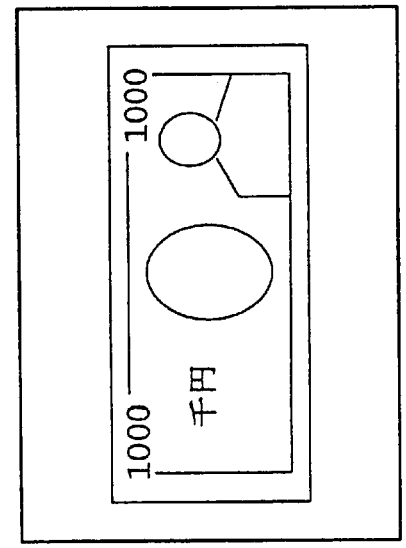
FIG. 4D is an imaginary diagram showing an image to be obtained by photographing a paper money in the embodiment of the invention.

In a case where the image represented by the image data for which the determination is to be made is an image to be obtained by photographing (a medium having recorded) a two-dimensional bar code as a main subject, as shown in FIG. 4E for example, the determination at the step 136 becomes affirmative and the control flow goes to a step 138, where the bar code is analyzed to recognize information represented by the bar code and the recognized information is stored in the non-volatile memory 58, and the process returns to the step 100.

The information represented by the bar code is thereby input to the digital still camera 10. Like this, the step 138 corresponds to a process at a processing portion in the fourth aspect of the invention.

As the information to be input to the digital still camera 10, there may be enumerated image capturing condition information for defining an image capturing condition of the digital still camera 10, processing condition information for defining a processing condition of an image processing to the image data, information to be added to a photographic print, etc.

The image capturing condition information may for example include a plurality of kinds of information provided in correspondence to a plurality of kinds of image capturing conditions, assuming a unit of information corresponds to a single image capturing condition of the digital still camera 10. The image capturing condition information may for example be supplied to the user from a maker or such of the digital still camera 10, having information corresponding to a single image capturing condition, as a unit, and a plurality of kinds of image capturing conditions collected to be coded, and recorded as a visible two-dimensional bar code (stack type or matrix type) on a sheet material such as paper.

The supply of the sheet material may for example be performed by mail to registered users, or by publication on books such as magazines.

A user who wants to input image capturing condition information to the digital still camera 10 can photograph, by the digital still camera 10, such portion of a sheet material with a recorded two-dimensional bar code representing the image capturing condition information that has the two-dimensional bar code recorded thereon.

Thereby, via the processes described, the image capturing condition information is input to and stored in the digital still camera 10, allowing selective use of a variety of image capturing conditions represented by the image capturing condition information input as the bar code.

The processing condition information may for example be comprised of a plurality of kinds of information provided in correspondence to a plurality of kinds of processing conditions, assuming a unit of information corresponding to a single processing condition.

As parameters comprising the processing conditions, there may for example be applied a "chromaticity" as a parameter that specifies how to control the chromaticity in a chromaticity control process in which the chromaticity of an image is controlled by controlling coefficients of a 3×3 matrix, "sharpness" as a parameter that specifies how much a sharpness is to be emphasized in a hyper-sharpness process in which the sharpness is emphasized by controlling a granularity, a "red-eye correction" parameter that specifies whether a red-eye correction process in which a correction is made of a defect of color tone (so-called red eye) in a region corresponding to an eye of a person is to be performed or not, a "setup level" as a parameter that specifies whether a Y correction as well or simply a concentration and color balance correction in a concentration and color correction process is to be performed, a "color conversion table" parameter that specifies which table is to be used among a plurality of color conversion tables provided for correction of a color balance in the concentration and color correction process, a "tone setting" parameter that specifies whether an image will be finished in a soft tone or hard tone, etc in a tone conversion process.

The processing condition information also may for example be supplied to the user from a maker or such of the digital still camera 10, having information corresponding to a single processing condition, as a unit, or information corresponding to a plurality of kinds of image capturing conditions collected to be coded, and recorded as a visible two-dimensional bar code on a sheet material.

A user who wants to input processing condition information to the digital still camera 10 can photograph, by the digital still camera 10, such portion of a supplied sheet material with a recorded two-dimensional bar code representing the processing condition information that has the two-dimensional bar code recorded thereon.

Thereby, via the processes described, the processing condition information is input to and stored in the digital still camera 10, allowing a variety of processing conditions represented by the processing condition information input by the bar code, to be selectively used when the digital still camera 10 executes an image processing to an image data obtained by the photographing.

The information to be added to a photographic print is information to be added (recorded) to the photographic print, when an image represented by an image data the user has obtained by photographing an arbitrary subject with the digital still camera 10 is recorded on a recording medium such as a photographic paper in a laboratory to prepare the photographic print by the user's request for example, and more specifically may be character information, illustration information, etc.

The character information may for example be a text data or the like which is a sentence describing an image in which an event or theme park, sight-seeing resort, building, or commodity is photographed as the subject, and is recorded as a two-dimensional bar code on a medium, like the image capturing condition information or processing condition information.

The two-dimensional bar code representing character information, since it is a bar code of character information which is a sentence describing for example an event or theme park, sight seeing resort, building, or exhibited commodity, can be recorded on a signboard or the like which is at the site.

A user, who has photographed an event or theme park, sight seeing resort, building, exhibited commodity or the like as a subject and wants to add character information describing the photographed subject to a photographic print, can photograph by the digital still camera 10 such portion of a signboard placed in the site that has as a record (indication) thereon, a two-dimensional bar code representing character information describing the photographed subject.

Thereby, the character information is input to and stored in the digital still camera 10, via processes described.

Then, for example, when requesting preparation of a photographic print, by having the digital still camera 10 perform a process for adding desired character information selected from among various character information input by the bar code to an image data of an image of the photographic print to be prepared, it is possible to add desired characters represented by the character information to the photographic print to be prepared in a laboratory.

The character information may for example be character information representing a word for classifying the image.

The illustration information may for example be a bit map data representing a map or the like of a place of a photographed subject in an image in which an event or theme park, sight-seeing resort, building, or commodity is photographed as the subject, and is recorded as a visible two-dimensional bar code on a medium, like the image capturing condition information or processing condition information or the character information.

Also the two-dimensional bar code representing illustration information, since it is a bar code representing an illustration representing a map or the like of a place where for example an event or theme park, sight seeing resort, building, exhibited commodity or such is photographed, it can be recorded on a signboard or the like which is at the site.

A user, who has photographed an event or theme park, sight seeing resort, building, exhibited commodity or the like as a subject and wants to add illustration information representing a map or the like of a place of the photographed subject to a photographic print, can photograph by the digital still camera 10 such portion of a signboard which is at the site that has as a record (indication) thereon, a two-dimensional bar code of illustration information representing a map or the like of the place of the photographed subject.

Thereby, the illustration information is input to and stored in the digital still camera 10, via processes described.

Then, for example, when requesting preparation of a photographic print, by having the digital still camera 10 perform a process for adding desired illustration information selected from among various illustration information input by the bar code to an image data of an image of the photographic print to be prepared, it is possible to add a desired illustration represented by the illustration information to the photographic print to be prepared in a laboratory.

It also is possible for the user to acquire a medium on which is recorded a bar code representing information to be input to the digital still camera 10, by for example gaining an access such as by use of a personal computer to a predetermined home page carrying the bar code, downloading the home page, and printing the same. The above-noted information may be input to the digital still camera 10 by photographing a display such as a personal computer in a state in which the predetermined home page is displayed.

In the above embodiment, a paper money or security determination process and a bar code determination process are performed in sequence in the case the image capturing condition is a particular image capturing condition or the detailed photographing mode is a document copy mode (more specifically, the bar code determination process is performed in the case of a determination that a pattern corresponding to a paper money or security is absent in he image), as the description is for an example in which the condition for a determination whether or not to perform the paper money or security determination process is identical to the condition for a determination whether or not to perform the bar code determination process. However, the invention is not limited thereto, the paper money or security determination process may not be performed when a strobo flash is flashed and a photographing is made, and the bar code determination process may not performed in a case where a photographing is made without flashing the strobo flash.

Further, although in the embodiment the particular image capturing condition is a case in which the "resolution (number of pixels) when photographing" is over 1000×1000 pixels and the "photographing distance" is within 1 m, the numerical values do not constitute a limitation, and other numerical values are applicable so far as they are values specifying an adequate image capturing condition for photographing a subject corresponding to a predetermined pattern.

Still further, just one of parameters for resolution and photographing distance may be employed to specify a particular image capturing condition, or those and other parameters may be employed in combination to specify a particular image capturing condition.

Even further, although the foregoing description is made of the digital still camera 10 as an example of an image capturing device according to the invention, this is not limited thereto, and the invention is applicable to any photographing apparatus so long as it has functions for photographing an optical image and converting this into image information, like a digital video camera or the like.

What is claimed is:

1. An image capturing device comprising:
 an image capturing portion which photographs an optical image and converts the optical image into image information;
 a determination portion for deciding whether or not an image represented by image information obtained by photographing by the image capturing portion includes a predetermined pattern;
 a processing portion for performing a predetermined process in a case where determination that the image includes the predetermined pattern is made by the determination portion; and
 a prohibiting portion which prohibits the determination by the determination portion in any case other than a case where photographing of an optical image is performed in at least one of a particular photographing mode and a particular image capturing condition suitable for photographing a subject corresponding to the predetermined pattern.

2. An image capturing device according to claim 1, wherein the determination portion performs a determination as to whether or not an image represented by image information obtained by photographing includes a predetermined pattern, by carrying out a pattern matching of image information representing the predetermined pattern and image information obtained by photographing and which was input from the image capturing portion.

3. An image capturing device according to claim 1, wherein the determination portion performs a determination as to whether or not an image represented by image information obtained by a photographing includes a predetermined pattern, by comparing an amount of an image characteristic calculated by performing a predetermined calculation on image information obtained by the photographing and which was input from the image capturing portion, with an amount of an image characteristic obtained by performing a predetermined calculation on image information representing the predetermined pattern.

4. An image capturing device according to claim 1, wherein the predetermined pattern is a pattern corresponding to one of a paper money and a security, and the processing portion performs, as the predetermined process, a process for preventing use of image information obtained by photographing.

5. An image capturing device according to claim 4, wherein the processing portion performs, as the process for preventing use of the image information, a deletion of the image information.

6. An image capturing device according to claim 4, wherein the processing portion performs, as the process for preventing use of the image information, a processing of the image information.

7. An image capturing device according to claim 1, further comprising a memory portion.

8. An image capturing device according to claim 1, wherein the predetermined pattern is a pattern which corresponds to a bar code, and the processing portion performs, as the predetermined process, recognition of information represented by the bar code and storing of the information represented by the bar code in the memory.

9. An image capturing device according to claim 1, further comprising a selecting portion for selecting whether or not to perform a determination on a pattern corresponding to a bar code as the predetermined pattern, wherein the prohibiting portion unconditionally prohibits a determination by the determination portion as to whether or not an image represented by the image information includes a pattern corresponding to the bar code in a case where the selecting portion has selected that the determination on a pattern corresponding to the bar code is not to be performed.

10. An image capturing device according to claim 1, wherein the particular image capturing conditions include a condition that photographing of optical images at a smaller distance than a predetermined value is carried out by dividing the optical image into a greater number of pixels than predetermined.

11. An image capturing device according to claim 10, wherein the particular image capturing conditions further include a condition that a strobo does not flash in a case where a pattern corresponding to one of a paper money and a security is used as the predetermined pattern.

12. An image capturing device according to claim 10, wherein the particular image capturing conditions further includes a condition that a strobo flashes in a case where a pattern corresponding to a bar code is used as the predetermined pattern.

13. An image capturing device according to claim 1, wherein, when photographing an optical image including a sheet material, the particular photographing mode is a document copy mode for performing a process for obtaining image information accurately representing visible information recorded on the sheet material.

14. An image capturing device according to claim 13, wherein the process in the document copy mode is a photographing mode for performing a hand shake correction process for image information obtained by photographing.

15. An image capturing device according to claim 13, wherein the process in the document copy mode is a photographing mode for performing a warp correction process for image information obtained by photographing.

16. An image capturing device according to claim 13, wherein the process in the document copy mode is a photographing mode for performing a process for selecting an image capturing frame when photographing for image information obtained by photographing is carried out.

17. An image capturing device according to claim 13, wherein the process in the document copy mode is a photographing mode for performing a process for cutting out a region corresponding to a main subject which is photographed using image information obtained by a photographing.

* * * * *